Aug. 13, 1940.   H. LANGGÄSSER ET AL   2,211,377
STEERING CONTROL
Filed April 14, 1938
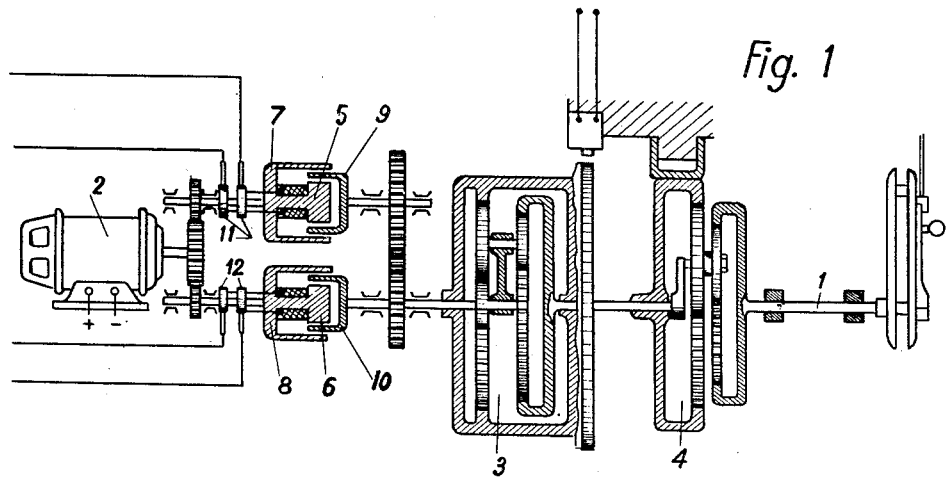
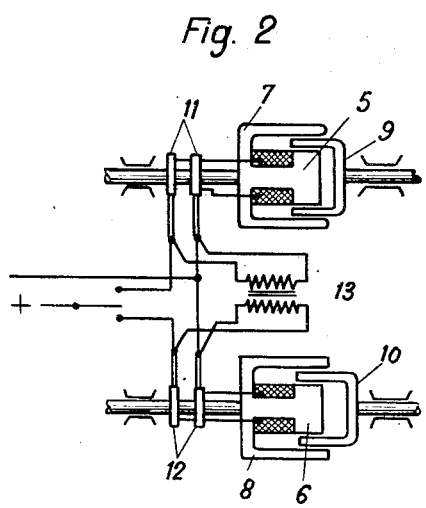
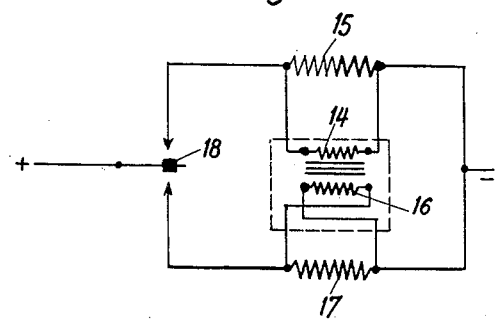
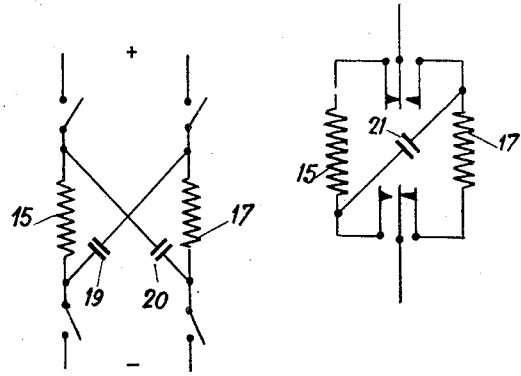
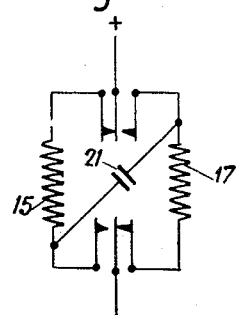
Heinrich Langgässer
Franz Fischer
    Inventors
By Stephen Cerstvik
       Attorney Patented Aug. 13, 1940

2,211,377

UNITED STATES PATENT OFFICE 2,211,377

STEERING CONTROL

Heinrich Langgässer, Berlin-Grunewald, and Franz Fischer, Berlin-Wilmersdorf, Germany, assignors to Siemens Apparate und Maschinen Gesellschaft mit beschrankter Haftung, Berlin, Germany, a corporation of Germany Application April 14, 1938, Serial No. 202,058 In Germany April 17, 1937

7 Claims. (Cl. 172—282)

The object of the invention is to operate the steering movements of an aircraft rudder control means by a continuously rotating motor, such as by an electric motor, and to control said movements by a control member through the intermediary of a pair of eddy current couplings adapted to be alternatively set into action according to the direction of steering. It is of secondary importance whether the couplings are connected to the control member directly or through the intermediary of a transmission means (gearing). It is obvious that it is advantageous to use quick action couplings and to communicate the driving torque through a reduction gearing.

The steering means according to the invention has a series of substantial advantages with respect to the known steering means.

In devices of the prior art utilizing mechanical couplings, these are subject to a certain wear. While this wear can be compensated to a certain extent by a renewal in due time of the friction surfaces, a certain inaccuracy of steering occurs, however, during the period of wear, which has an undesirable influence on the steering effect. Such drawbacks are eliminated by the use of eddy current couplings.

Similar undesirable steering effect can take place in prior steering means having cooperating, contacting mechanical parts embodied therein, due to the fact that the coefficient of friction and therefore also the power transmission depend on factors which are beyond control. Should the coupling become oily to a slight extent, the transmission ratio may be completely altered. The eddy current couplings in which no contact takes place are exempted from such a disturbing influence.

The eddy current coupling has the advantage of being smoothly running, and is free of severe shocks, which are extremely detrimental to sensitive steering controls. The eddy current coupling with smooth running are besides adapted to support a heavy overload. The member to be coupled to the continuously rotating driving motor is of small size and has only a little inertia moment. No detrimental mass effect can, therefore, take place. On the other hand, the continuously rotating coupling member has a substantially important inertia moment. It acts therefore as an inertia mass and enables the use of a relatively little driving motor, since it takes up the load shocks and eliminates the action thereof on the motor.

This summary, which is given only as an example, shows that the use of eddy current couplings for steering control means, more particularly for aircraft, presents a series of valuable advantanges.

In the drawing, wherein are illustrated various embodiments of the invention:

Fig. 1 is an elevation in section illustrating one form of the fundamental combination comprising the invention;

Fig. 2 is a fragmentary diagrammatic view illustrating another embodiment of the coupling elements of Fig. 1;

Fig. 3 is a diagrammatic view illustrating in greater detail the coupling system of Fig. 2;

Fig. 4 is a diagrammatic view illustrating another embodiment of the coupling system of Figs. 2 and 3; and Fig. 5 is a diagrammatic view of a modification of the system of Fig. 4.

Referring to the drawing, and more particularly to Fig. 1, the actuation of the rudder shaft takes place by means of a continuously rotating electric motor 2, which is connected to the shaft 1 through the intermediary of a two-stage gearing 3, 4. Between the continuously rotating electric motor 2 and the gearing, there are inserted, for alternate right and left drive, eddy current couplings 5 and 6. By an electric control, (not shown) there is energized, according to the desired direction of rotation, either the coupling 5 or the coupling 6, and the shaft 1 is therefore rotated in one or the other direction. The eddy current couplings are formed by an outer continuously rotating member 7 or 8, of a substantially large mass, and an inner coupling member 9 or 10 of substantially small mass. The energizing current of the coupling is fed, through the intermediary of a pair of slip-rings 11 or 12.

An undesirable feature of such couplings consists in the fact that the magnetic field extinguishes slowly when the energization of the clutch is disconnected. The driving torque is therefore transmitted longer than necessary, and besides a considerable spark is produced in the energizing controlling contact.

These disadvantages may be eliminated, according to the invention, through a coupling transformer whose primary and secondary are connected in parallel with the respective energizing windings of the eddy current couplings. Such an embodiment is illustrated in Figures 2 and 3. Referring to Fig. 3 which illustrates in greater detail the system of Fig 2, one winding 14 of the transformer 13 is connected in parallel to one of the energizing windings, such as the winding 15 of coupling device 5 and the other winding 16 of transformer 13 is connected in parallel to the other energizing winding such as winding 17 of the coupling device 6, in this case, however, the connections of the extremities of winding 16 being transposed with respect to winding 17. Through this arrangement, the following result is obtained.

On opening of the control switch 18, the magnetizing current on the heretofore energized coupling passes through one winding of the coupling transformer, and thereby an induction current is developed in the second winding of the transformer, which passes in such a way, through the energizing winding of the second coupling, that this is already pre-energized in the correct sense when the contact 18 is switched over from one to the other coupling.

The transmission of the magnetic energy from one coupling to the other and the spark extinguishing may be obtained through a capacity as shown in Fig. 4. For this purpose, two condensers 19 and 20 are provided as shown. Obviously, the magnetic coupling in this disposition must be bipolar.

Figure 5 shows how the same end may be obtained with but a single condenser 21. The there illustrated change-over switch operates in such a way that, during the switching operation, the three contacts touch for a short time. This disposition, by setting into action one coupling from the normal position, produces no current impulse on the second.

It should be noted that the coupling of induction or capacity coupling may be interesting, not only in eddy current couplings, but also in magnetic couplings and other electrically controlling couplings, with energizing windings.

What we claim is:

1. A control device for aircraft and the like, comprising a driving motor continually rotating in one direction, a control surface, means connecting said motor and surface comprising a pair of electrical couplings, each including a driving member and a driven member out of contact with each other at all operative positions thereof, said driving members being connected to said motor for rotation in opposite directions, each of said driven members being connected to said control surface for movement thereof in opposite directions, respectively, means for selectively, electrically connecting said driving and driven members of each of said pairs, whereby said surface is selectively moved in a chosen direction by said motor, and electrical means connecting said couplings and being energized by one of said driving members.

2. A control device for aircraft or the like, comprising a driving motor continuously rotating in one direction, a control surface, means connecting said motor and surface comprising a pair of electrical couplings, each including a driving member and a driven member out of contact with said driivng member at all operative positions thereof, said driving members being connected to said motor for rotation in opposite directions, switching means for selectively coupling said driving and driven members, and means comprising electrical instrumentalities disposed between said couplings for modifying the action of said couplings.

3. A control device for aircraft and the like, comprising a motor continuously rotating in one direction, a pair of electrical couplings connected to said motor for rotation in opposite directions, each comprising a driving member and a driven member, said driven member being so located with respect to said driving member as to be out of contact therewith at all operative positions thereof, means for selectively electrically connecting the driving and driven members of said pair of couplings, and electrical means producing a conveyance of electrical energy from one of said couplings, to the other of said couplings when one of said couplings is electrically disconnected.

4. A control device for aircraft or the like, comprising a motor continuously rotating in one direction, a pair of electrical couplings connected to said motor for rotation in opposite directions, each comprising a driving member and a driven member out of contact with each other, means for selectively electrically connecting the driving and driven members of said pair of couplings, and inductive means interconnecting said couplings for producing a conveyance of electrical energy from one coupling to the other whereby a quick stoppage of power transmission is produced and sparking is eliminated.

5. A control device for aircraft or the like, comprising a motor continuously rotating in one direction, a pair of electrical couplings connected to said motor for rotating in opposite directions, each comprising a driving member and a driven member out of contact with each other, means for selectively electrically connecting the driving and driven members of said pair of couplings, and capacity means producing a conveyance of electrical energy from one coupling to the other whereby a quick stoppage of power transmission is produced and sparking is eliminated.

6. A control device for aircraft or the like, comprising a motor continuously rotating in one direction, a pair of electrical couplings connected to said motor for rotation in opposite directions, each comprising a driving member and a driven member out of contact with each other, and means for selectively electrically connecting the driving and driven members of said pair of couplings and comprising an electrical coil for each of said couplings, and a transformer, the primary of said transformer being connected to one of said coils and the secondary of said transformer being connected to the other of said coils.

7. A control device for aircraft or the like, comprising a motor continuously rotating in one direction, a pair of electrical couplings connected to said motor for rotation in opposite directions, each comprising a driving member and a driven member out of contact with each other, and means for selectively electrically connecting the driving and driven members of said pair of couplings and comprising an electrical coil for each of said couplings, and capacity means electrically interconnecting said coils.

HEINRICH LANGGÄSSER.
FRANZ FISCHER.